United States Patent [19]

Okinaga

[11] Patent Number: 5,040,341
[45] Date of Patent: Aug. 20, 1991

[54] ROTARY CUTTER WHEEL

[76] Inventor: Hiroaki Okinaga, Miyamae Royal Height - Room 305, 16-23, Miyamae 1-chome, Suginami-ku, Tokyo, Japan

[21] Appl. No.: 510,078

[22] Filed: Apr. 17, 1990

[51] Int. Cl.$^5$ .............................................. B23D 59/02
[52] U.S. Cl. ................................ 51/206 R; 51/209 R; 51/266
[58] Field of Search ........ 125/15; 51/206 R, 206 NF, 51/206 P, 206.4, 206.5, 209 R, 266

[56] References Cited

U.S. PATENT DOCUMENTS

| | | | |
|---|---|---|---|
| 2,749,681 | 6/1956 | Reidenbach | 51/209 R |
| 2,755,601 | 7/1956 | Lux | 51/209 R |
| 3,016,661 | 1/1962 | Nielsen | 125/15 |
| 3,420,010 | 1/1969 | Tobey | 51/206 R |
| 3,579,928 | 5/1971 | Held | 51/206 R |
| 4,516,560 | 5/1985 | Cruickshank | 125/15 |

FOREIGN PATENT DOCUMENTS

| | | | |
|---|---|---|---|
| 3708360 | 9/1989 | Fed. Rep. of Germany | 125/15 |
| 0109078 | 4/1889 | Japan | 125/15 |

Primary Examiner—Frederick R. Schmidt
Assistant Examiner—Blynn Shideler
Attorney, Agent, or Firm—Wenderoth, Lind & Ponack

[57] ABSTRACT

By rotating at a high speed a cutter wheel having air intake ports and air injection ports which communicate through an inner cavity, surrounding air is introduced into the cavity from the air intake ports and discharged out through the air injection ports by the centrifugal force brought about by the rotation of the cutter wheel, to spontaneously induce a strong current of air. In this manner, cutting bits which are attached to the peripheral portion of the cutter wheel and produce superheat in cutting a rigid material such as concrete are effectively cooled by the air current thus induced.

20 Claims, 6 Drawing Sheets

ROTARY CUTTER WHEEL

BACKGROUND OF THE INVENTION

1. Field of the Invention

This invention relates to a cutter wheel for use in cutting a work piece material such as concrete, and more particularly to a rotary cutting wheel having cutting bits, which is capable of spontaneously producing a strong current of air when being rotated for cutting a rigid material so as to cool effectively the cutting bits.

2. Description of the Prior Art

For the purpose of cutting rigid materials such as concrete, asphalt, brick, tiles and stone, there has been generally used a rotary cutter wheel, comprising a cutter base having a substantially disc shape and at least one cutting bit which is formed by shaping and sintering ultrahard abrasive grains including diamond grains or the like and attached to the peripheral portion of the cutter base by silver soldering. When cutting such a rigid material with the cutter wheel of this type, superheat is generated due to friction between the cutting bit and the rigid material. The frictional heat generated in cutting the rigid material increases remarkably the wear rate of the cutting bit, to thereby decrease the lifetime of the cutting blade.

To prevent the cutting bit of the cutter wheel from reaching a high temperature in cutting, there have conventionally been employed various method for cooling the cutting bit by forcing water or air to spout from the circumferential part of the cutter wheel towards the cutting bit. A conventional water-cooling method using water as coolant has an effect of sufficiently cooling the cutting bit, whereas it entails a disadvantage in that the material to be cut and the circumferences thereof are considerably stained with the water spouted from the cutter wheel. If a hood cover encircling the cutter wheel is used for recovering the water spouted from the cutter wheel, it adds to the size and complexity of the cutter device and renders the handling of the device difficult.

As one example of an air-cooling method using air as a coolant for the cutting bit, Japanese Utility Model Appln. Public Disclosure SHO 64-42110(A) describes a device in which air is compulsorily introduced into interior air passages formed radially in the cutter base and sent out from the outer peripheral part of the cutter wheel. This forced air-cooling method requires an air supplying system including an air compressor and an air supplying pipe, and therefore, it limits the handling of the cutting device.

Thus, it may be envisaged that a separate air introducing fan is attached to the outside of a rotary cutter wheel having a plurality of interior air passages formed radially so as to permit air introduced into the air passages by the fan attached to the wheel when rotating the wheel to spout out from the peripheral part of the cutter wheel towards one or more cutting bits mounted on the circumferential part of the wheel. To carry out the idea mentioned above, there may be used a cutter wheel having radial air slots as proposed in U.S. Pat. No. 3,049,843 and Japanese Utility Model Appln. Public Disclosure SHO 64-42110(A).

However, such a cutter wheel having the aforesaid structure is not practical from the viewpoint of productivity and handling. That is to say, the cutter device using such a fan built-on type cutter wheel which comprises a plurality of air passages formed radially in the wheel base thereof and the aforenoted separate fan attached to the outside surface of the wheel base is disadvantageous in that it is bulky and requires labor for its assembly. Besides, this cutter wheel entails problems such as decrease in rotating performance due to the imbalance thereof and difficulty in forming the air passages of small diameter within the wheel base.

Furthermore, in the cutter wheel of this type having one or more cutting bits attached to the cutter base and formed of ultrahard abrasive grains including diamond grains or the like, the cutting bits must be fixedly placed at the prescribed positions on the peripheral portion of the cutter base with a high accuracy. If the longitudinal center of the cutting bit does not exactly coincide with the circumferential center of the cutter base, the cutter wheel rotates and causes wobbling and vibration to decrease the rotating performance of the cutter wheel and may cause the cutting bit to break.

OBJECT OF THE INVENTION

This invention was made in consideration of the aforesaid drawbacks of the rotary cutter wheel of the past. Its object is to provide a rotary cutter wheel capable of spontaneously generating a strong current of air to cool effectively the cutting bits and blow off cutting chips produced in cutting a work piece material such as concrete without using a forced air-supplying means such as an air compressor.

Another object of the invention is to provide a rotary cutter wheel which is simple in structure, easy to assemble and handle, and applicable to a common electric hand cutter.

Still another object of the invention is to provide a rotary cutter wheel having a structure capable of readily locating cutting bits at the prescribed peripheral portions of a cutter base with a high accuracy so as to permit the wheel to rotate stably.

SUMMARY OF THE INVENTION

To attain the objects described above according to this invention there is provided a rotary cutter wheel comprising a rotary cutter base which is provided on its peripheral portion with cutting bits and formed by providing two disc plates each having a bulging portion in face contact with each other so as to define a cavity serving as an air passage between the disc plates. The disc plates each have air intake ports and air injection ports which communicate with one another through the cavity defined by the bulging portions of the disc plates.

The air intake ports are formed in the radially inner portion of the disc plates, and the air injection ports are formed in the radially outer portion of the same. Thus, when the cutter wheel rotates, air in the cavity between the disc plates is forced out through the air injection ports by the centrifugal force brought about by the rotation of the wheel, and simultaneously, the surrounding air is forcibly introduced in the cavity, to consequently spontaneously induce an air current from the air intake ports to the air injection ports through the air passage cavity. When rotating the cutter wheel at a high speed, a strong current of air is generated to effectively cool the cutting bits and blow off the cutting chips produced in cutting the work piece.

By forming radially-lengthwise air slots in the peripheral portion of the cutter wheel, the air current induced in rotating the cutter wheel can be effectively directed to the cutting bits.

By bending outwardly the peripheral end parts of the disc plates to form flange members each having a plane perpendicular to the cutter base, the cutting bits can be readily attached in position to the peripheral portion of the cutter base. Furthermore, by forming locating grooves between the flange members of the opposite peripheral end parts of the disc plates and locating projections on the cutting bits to be attached to the cutter base, the cutting bits can be easily placed at the prescribed positions on the peripheral portion of the cutter base with accuracy and firmly united with the cutter base by means of the locating projections to be fitted in the locating grooves.

These and other objects and characteristics of the present invention will become apparent from the further disclosure to be made in the detailed description given below.

BRIEF DESCRIPTION OF THE DRAWINGS

The preferred embodiments of the present invention will now be explained in detail with reference to the accompanying drawings, wherein.

DESCRIPTION OF THE PREFERRED EMBODIMENTS

Figure 2:
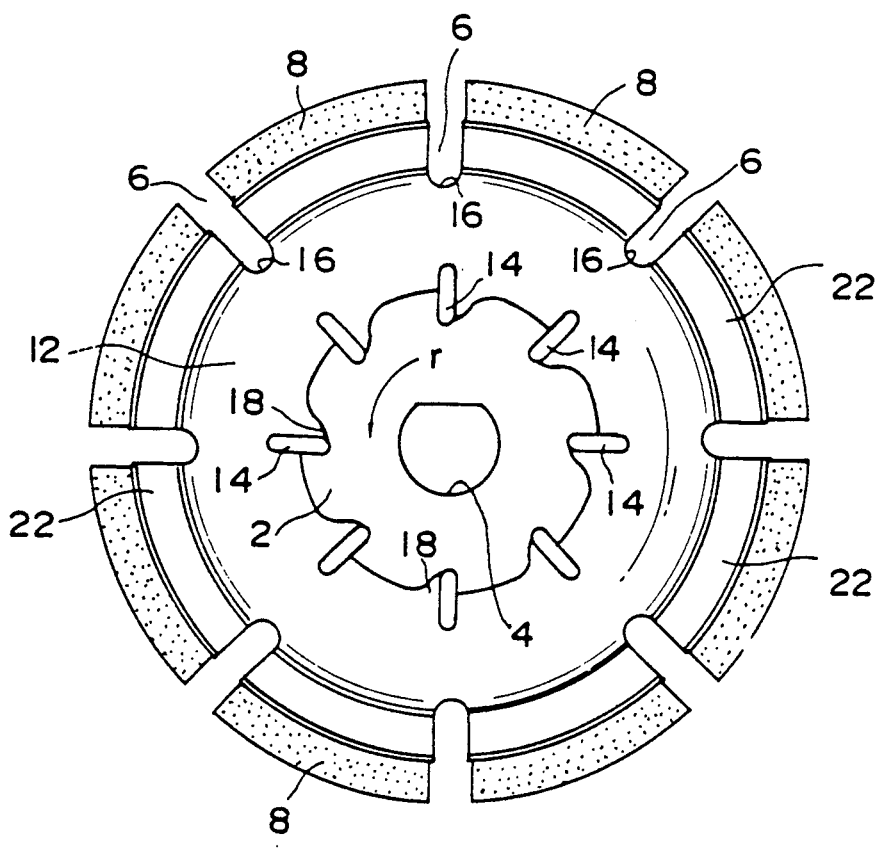
FIG. 2 is a side view of the same.
Figure 3:
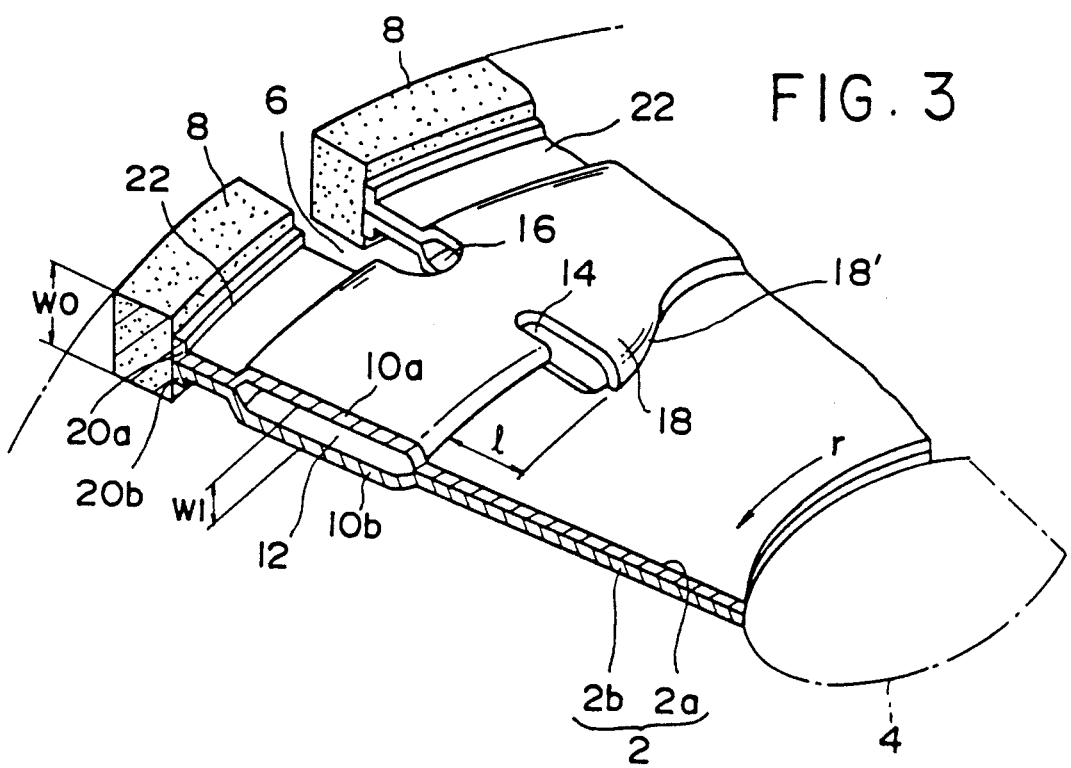
FIG. 3 is a partly cutaway perspective view of the same.

This invention utilizes the air current induced spontaneously by rotating a cutter wheel as a coolant for cutting bits which produce superheat in cutting a rigid material such as concrete. A first preferred embodiment of this invention will be described hereinafter with reference to FIG. 1 through FIG. 3.

The rotary cutter wheel according to this invention comprises a rotary cutter base 2 having at its center portion a fitting hole 4 for receiving a driving shaft Sd of an electric hand cutter, and having radially-lengthwise air slots 6 formed in the peripheral portion thereof to form a plurality of peripheral segments. A plurality of substantially arc-shaped cutting bits 8 are attached to the peripheral segments of the cutter base 2. The cutting bits 8 are formed by shaping and sintering ultrahard abrasive grains including diamond grains or the like. The radially-lengthwise slots 6 formed in the cutter base 2 not only serve to ensure cutting edges of the cutting bits 8, but also have a function of permitting cutting chips produced in cutting the rigid material to escape and cooling the cutting bits 8 which produce heat in cutting the rigid material. In this embodiment, though the fitting hole 4 formed at the center portion of the cutter base 2 is shown as being circular with flattened side, it is not limited to this shape. That is, the shape of the fitting hole 4 may be decided on the basis of the shape of fixing members F1 and F2 with which the cutter base 2 is securely retained on the driving shaft Sd.

The cutter base 2 is formed substantially by two disc plates 2a, 2b which are in face contact with each other. The disc plates 2a, 2b have respective bulging portions 10a, 10b formed substantially in a coaxial circular shape, so that a cavity 12 is formed between the bulging portions, 10a, 10b when the disc plates 2a, 2b are placed in face contact with each other. The disc plates 2a, 2b have air intake ports 14 formed in the radially inner peripheral side of the respective bulging portions 10a, 10b and air injection ports 16 formed in the radially outer peripheral side of the same. The air intake ports 14 and air injection ports 16 communicate with one another through the cavity, so that an air passage is formed from the air intake ports 14 to the air injection ports 16 through the cavity 12. Though the air intake ports 14 and air injection ports 16 in this embodiment are equal in number, the number of the air intake ports is not limited, whereas, for example, it may be larger than that of the air injection ports.

When the cutter wheel having the aforementioned structure is rotated in one direction, air in the cavity 12 defined between the bulging portions 10a, 10b is forced out through the air injection ports 16 by the centrifugal force brought about by rotating the wheel. At the same time, the outside air is forcibly introduced into the cavity 12. As a result, a strong current of air flowing from the air intake ports 14 to the air injection ports 16 through the air passage cavity 12 is spontaneously induced by rotating the wheel at a high speed. By the air discharged from the air injection ports 16, the cutting bits 8 which produce heat in cutting the rigid material are cooled.

Figure 4:
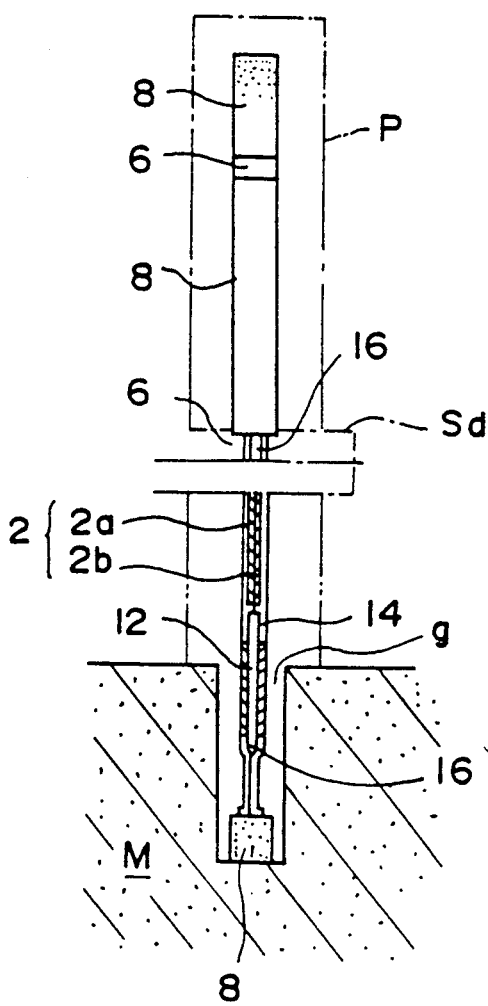
FIG. 4 is a front view, partly in axial section, of the cutter wheel in use.
Figure 5:
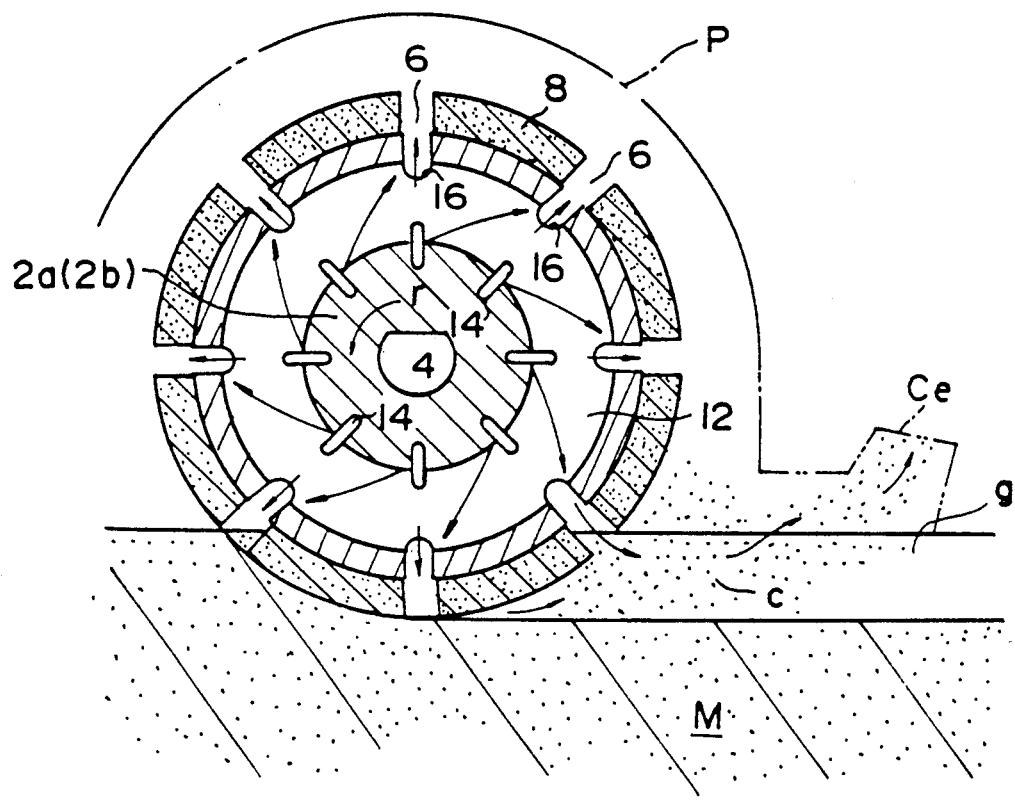
FIG. 5 is a sectional side view of FIG. 4.

To be specific, by rotating the cutter wheel retained by the driving shaft Sd of the electric hand cutter while bringing the cutting bits 8 in continuous contact with the rigid material M under pressure, a cut groove g can be made in the material as illustrated in FIGS. 4 and 5. Though the cutting bits 8 generally reach a high temperature and generate superheat in cutting the rigid material, they are effectively cooled by the air current spontaneously induced by rotating the cutter wheel as touched on briefly earlier.

In order to increase the efficiency of inducing the air current and improve the stability in rotation of the cutter wheel, the following component elements may preferably be provided on the aforementioned basic structure of the cutter wheel.

As seen in the illustrated embodiment, the air intake ports 14 are formed circumferentially at regular intervals in the radially inner end portions of the bulging portions 10a, 10b of the respective disc plates 2a, 2b. The circumferentially rearward part defining each air intake port 14 relative to the rotational direction r of the cutter wheel is elongated radially inwardly to form a flap means 18. When the cutter wheel is rotated in the direction r, the surrounding air is forcibly introduced into the air passage cavity 12 through the air intake ports 14 by the flap means 18, consequently to increase the rate of the air current discharged through the air injection ports 16.

Though the efficiency of introducing the air in the cavity 12 is fundamentally increased with lengthening the radially inward elongation (length l in FIG. 3) of the flap means 18, there is a limit to the increase in efficiency of producing the air current which flows through the cavity 12. Therefore, the flap means 18 should be properly determined. A stepped portion 18' extending backward from the flap means 18 defining each air intake port 14 is curved in a substantially S-shape or streamline shape to decrease resistance of the air.

The outside width w1 of the bulging portions 10a, 10b is smaller than the width w0 of the cutting bit 8. In a case where the cutter wheel having a diameter of 110 mm was actually manufactured by use of a plate of stainless steel having 0.5 mm in thickness, the outside width w1 of the cavity 12 was 1.4 mm, and the width w0 of the cutting bit 8 was 2.2 mm. When the cutter wheel noted herein is rotated at about 12,000 rpm by way of example, it is preferable to determine the length l of elongation of the flap means 18 to the order of 1.0 to 1.5 mm.

For example, each of the disc plates 2a, 2b having the air intake ports 14, air injection ports 16 and flap means 18 can be easily formed by sheet metal processing. The disc plates 2a, 2b thus formed are firmly united with each other by spot welding or the like.

In order to securely attach the cutting bits 8 to the peripheral segments into which the peripheral portion of the cutter base 2 is segmented by the air slots 6, the peripheral segments of the respective disc plates 2a, 2b are bent outwardly to form flange members 20a, 20b each having a plane perpendicular to the cutter base 2, so that the cutting bits 8 can be attached to the flange members 20a, 20b.

Between the bulging portion 10a (10b) and the flange member 20a (20b), there is formed a spill groove 22 for permitting cutting chips produced in cutting the rigid material to escape therethrough.

Figure 1:
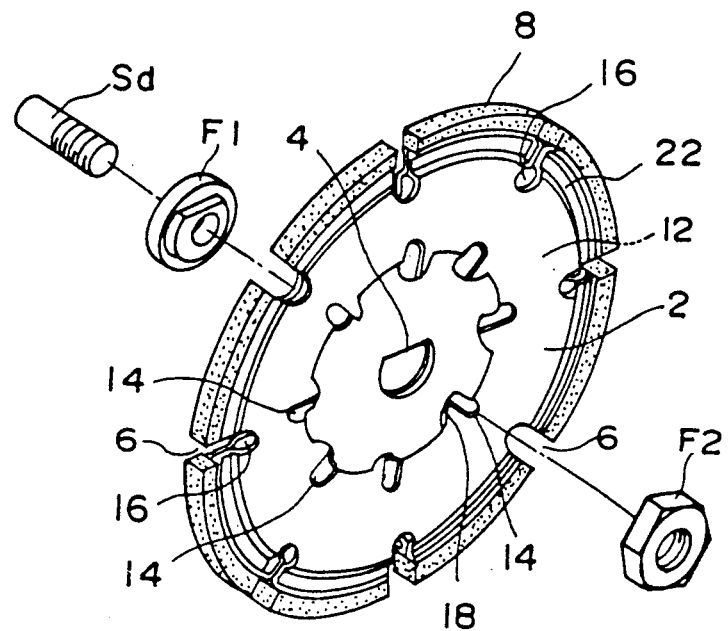
FIG. 1 is a perspective view illustrating a first embodiment of the rotary cutter wheel according to this invention.

In a case of using the cutter wheel for cutting the rigid material, the cutter wheel having the aforementioned structure is first retained by the driving shaft Sd of the electric hand cutter P or other possible machine by means of the fixing members F1, F2 as shown in FIG. 1. Then, the electric hand cutter P is operated to rotate the driving shaft Sd at a high speed, and the cutter base 2 with the cutting bits 8 is moved by hand along the surface of the rigid material M while being pressed against the rigid material, to thereby make a cut groove g in the rigid material as shown in FIGS. 4 and 5. At this time, air in the cavity 12 of the cutter base 2 is forced out through the air injection ports 16 by the centrifugal force which is brought about by the rotating of the cutter wheel in the direction r. At the same time, the outside air is forcibly inhaled in the cavity 12, consequently to spontaneously induce an air current from the air intake ports 14 to the air injection ports 16 through the air passage cavity 12 as shown in FIG. 5.

The air discharged continuously from the air injection ports 16 is sent to the circumferences of the cutting bits 8 through the air slots 6 and spill grooves 22, to thereby cool the cutting bits 8 which generate heat due to friction relative to the rigid material to be cut. By the action of the air flowing through the spill groove 22, the cutting chips c produced in cutting the rigid material can effectively escape through the spill groove, whereby the cut groove g can be prevented from being accidentally plugged with the chips c, resulting in a remarkable improvement in cutting work.

The cutting chips c which are eliminated from the cut groove g by the rotation of the cutter wheel are discharged outwardly through a chip outlet Ce as shown in FIG. 5, and may be forcibly drawn out by means of a chip arrester (not shown) connected to the chip outlet Ce.

In this embodiment, the air intake ports 14 are formed in pairs at the opposite positions of the disc plates 2a, 2b, but may be shifted circumferentially in position as a matter of course. Though the air intake ports 14 and air injection ports 16 are preferably located at regular intervals circumferentially, they may not necessarily be located at regular intervals so long as the cutter wheel is kept in an equilibrium state of rotation (i.e. balanced).

Figure 6:
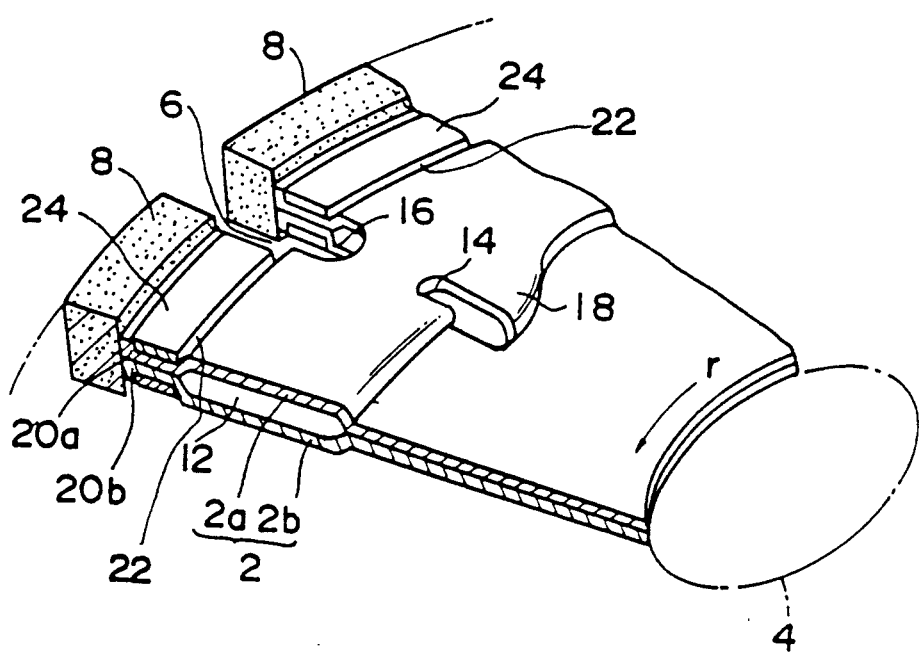
FIG. 6 is a partly cutaway perspective view of a second embodiment of this invention.

FIG. 6 shows a second embodiment of this invention, in which reinforcing plates 24 are fitted in the spill grooves 22 formed between the bulging portions 10a, 10b and the flange members 20a, 20b. With these reinforcing plates 24, the peripheral segments of the rotary cutter base 2 by which the cutting bits 8 are retained can be strengthened. In the diagram, the reference numerals which have equivalents in the diagrams of the embodiment mentioned above denote identical or equal component parts.

Figure 7:
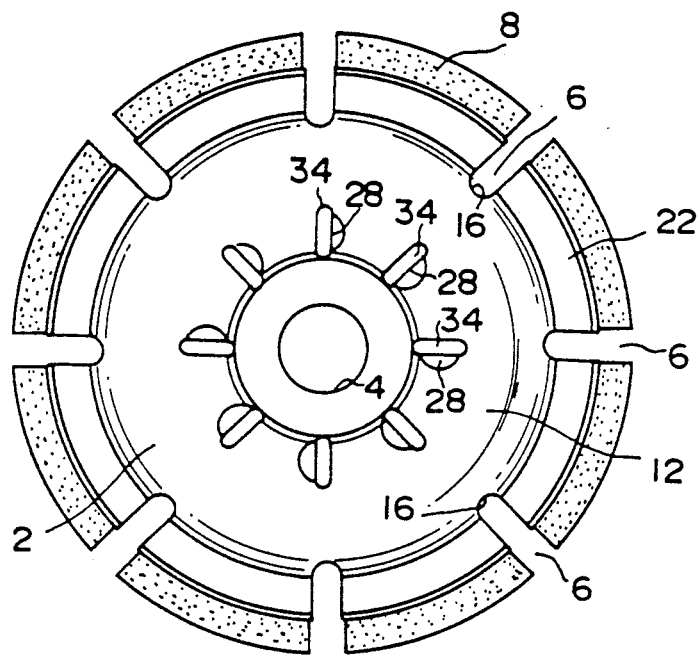
FIG. 7 is a side view of a third embodiment of this invention.
Figure 8:
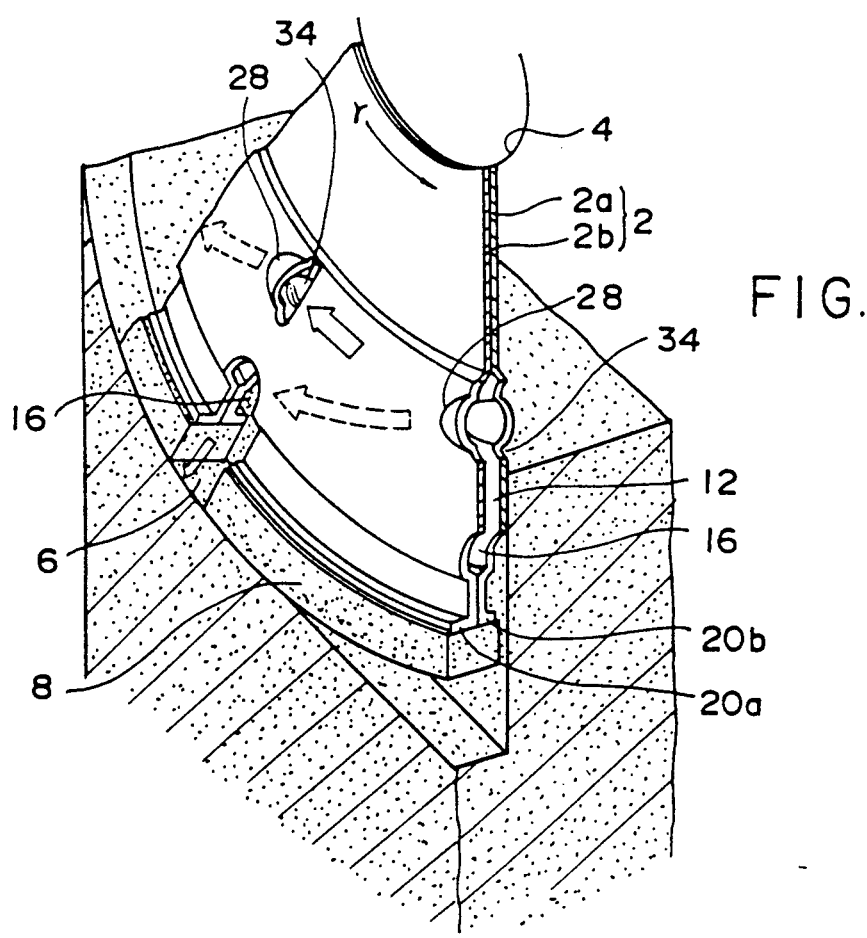
FIG. 8 is a partly cutaway perspective view of the same.

In a third embodiment shown in FIGS. 7 and 8, there are formed a plurality of air intake ports 34 in the flat side surfaces constituting the respective bulging portions 10a, 10b of the disc plates 2a, 2b. On the circumferentially rearward portions of the air intake ports 34 relative to the rotational direction r, there are formed quadrant cup-like flap means 28 protruding sidewards from the flat side surfaces of the disc plates 2a, 2b. The structure of this embodiment can heighten the effect of cooling the cutting bits 8, similarly to the foregoing embodiments.

Since the air intake ports 34 in this embodiment are formed in pairs at the opposite positions on the disc plates 2a, 2b, the collision of the air flowing into the cavity 12 through the paired air intake ports 34 opposite to each other causes the efficiency of introducing the surrounding air into the cavity 12 to be somewhat reduced and involves noise and vibration.

Figure 9:
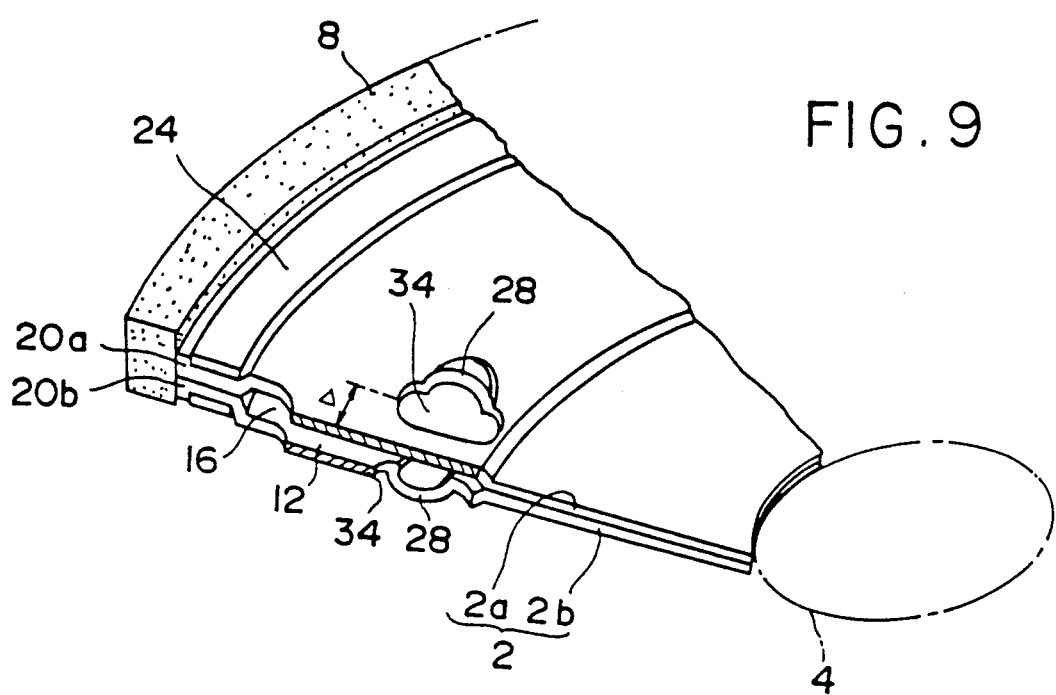
FIG. 9 is a partly cutaway perspective view of a fourth embodiment of this invention.

In order to eliminate such drawbacks suffered by the air intake ports opposite to each other, the air intake ports 34 may be shifted by the distance Δ in the circumferential direction as shown in FIG. 9. According to this structure having the air intake ports 34 shifted circumferentially, the surrounding air can be introduced into the cavity 12 with high efficiency without causing noise and vibration. The distance Δ by which the air intake ports 34 are shifted may be properly determined so as to prevent the collision of the air introduced from the air intake ports into the cavity.

Also, this embodiment illustrated in FIG. 9 as the fourth embodiment has the reinforcing plates 24 disposed between the respective bulging portions 10a, 10b and flange members 20a, 20b. However, the reinforcing plates 24 are not indispensable constituents of this invention.

Figure 10:
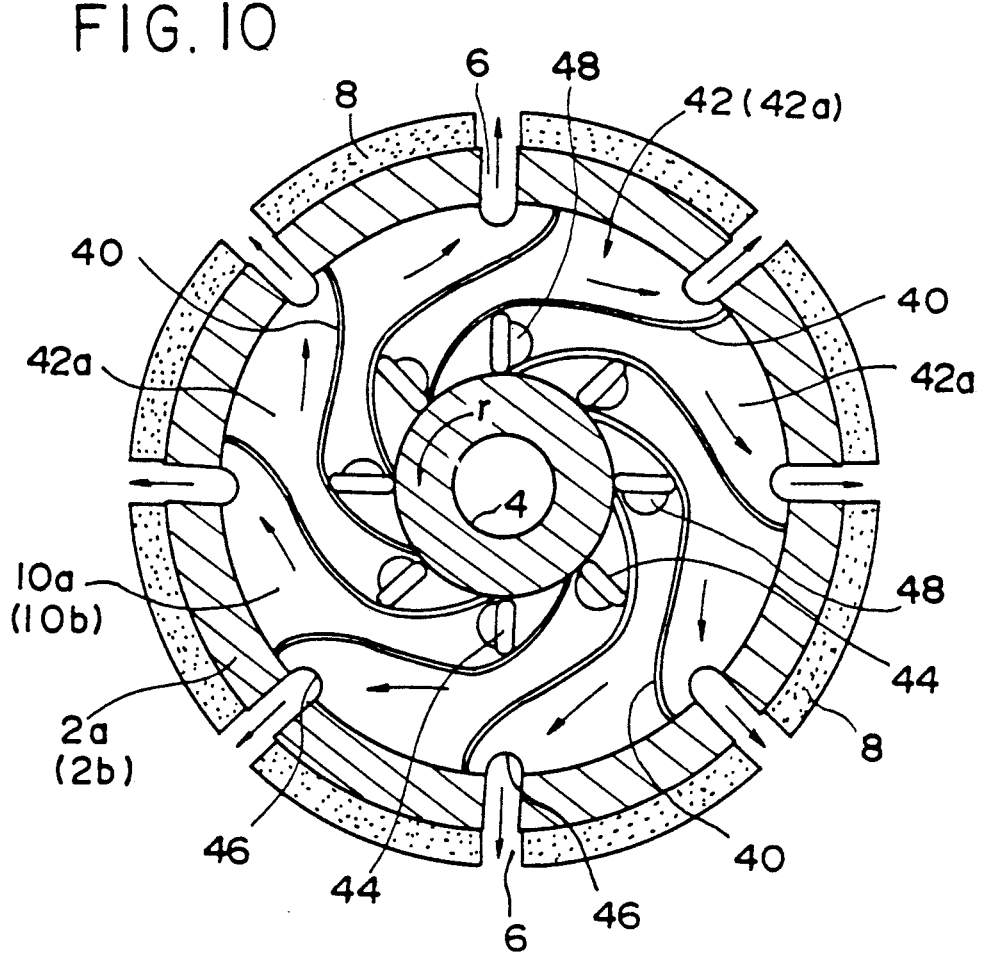
FIG. 10 is a sectional side view of a fifth embodiment of this invention.

A fifth embodiment of the invention shown in FIG. 10 is provided inside a cavity 42 with partition members 40 so as to form air passages 42a through which air intake ports 44 and air injection ports 46 formed in the disc plates 2a, 2b are individually connected with each other. The partition members 40 are arranged in the cavity 42 so as to run rearwardly in an inner to outer direction of the cutter base 2 relative to the rotational direction r. Though the partition member 40 in the illustrated embodiment is formed in a substantially S-shape, it may be simply curved helically. Through the air passages 42a defined by the partition members 40, each air intake port 44 is connected with the air injection port 46 located backward by one pitch (22.5°) relative to the rotational direction r in this embodiment. However, the structure is not necessarily limited to this structure. For example, one or more air intake ports 44 may be connected with two or more air injection ports 46 through one air passage 42a.

The partition members 40 may, for example, be fixed on the inner surface or surfaces of one or both of the disc plates 2a, 2b by spot welding.

According to this cutter wheel having the air passages 42a defined by the partition members 40, the air introduced into the cavity 42 by the rotation of the wheel is guided by the partition members 40 to flow along the air passages 42a. Thus, the partition members 40 in the cavity 42 serve as a so-called blowing fan, so that the air can be directed to the cutting bits 8 disposed at the peripheral segments of the cutter wheel with notably high efficiency without causing turbulence in the cavity. Consequently, the cutting bits 8 which produce heat in cutting a rigid material can be effectively cooled.

Though this embodiment shown in FIG. 10 has quadrant cup-like flap means 28 protruding sideways from the flat side surfaces of the bulging portions 10a, 10b, the flap means 18 which are elongated radially inwardly from the radially inner sides of the bulging portions 10a, 10b may of course be employed in place of the quadrant cup-like flap means 28, as seen in the embodiment shown in FIG. 1. Any other components denoted by like symbols are equivalents in the foregoing embodiments.

Figure 11A:
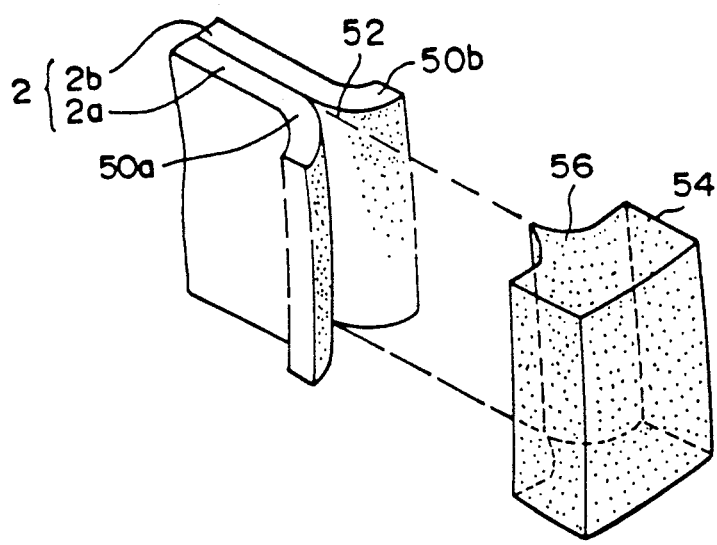
FIGS. 11(A) and 11(B) are perspective view and sectional front view showing the principal portion of a sixth embodiment of this invention.
Figure 11B:
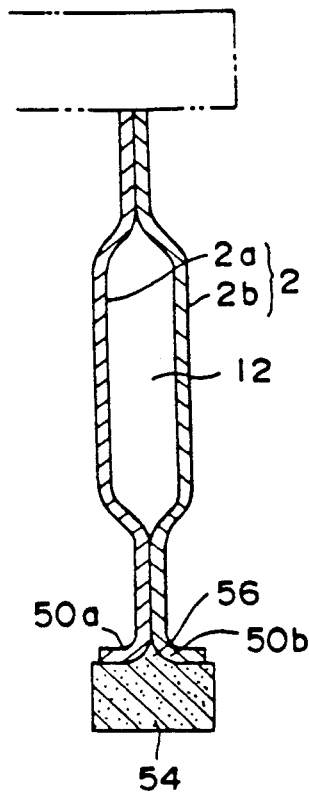

FIGS. 11(A) and 11(B) illustrate, in part, a sixth embodiment having a structure capable of firmly attaching the cutting bits to the peripheral segments of the cutter base 2 and readily locating the cutting bits at desired positions with accuracy.

Since the cutting bits receive impacts and stress in cutting the rigid material, they should be securely fixed on the peripheral segments of the cutter base. Moreover, to assure stable rotation for the cutter wheel, the cutting bits must be located on the peripheral segments of the cutter base with a high accuracy. The sixth embodiment of this invention was made to satisfy these requirements and enable the cutter wheel to be assembled with ease.

In the embodiment, by bending outwards the peripheral segments of the disc plates 2a, 2b constituting the cutter base 2, there are formed flange members 50a, 50b each having a plane perpendicular to the cutter base. When bending the peripheral segments of the disc plates 2a, 2b in order to form the flange members 50a, 50b, the corners formed between the disc plates and flange members are made round as partially illustrated in the diagrams, so as to form locating grooves 52 each having a substantial triangular shape at the butt portions of the flange members 50a, 50b. On the other hand, the cutting bits 54 are provided on their surfaces opposite to the flange members 50a, 50b with locating projections 56 to be fitted into the locating grooves 52.

Since the cutting bits 54 are generally formed by shaping and sintering ultrahard abrasive grains including diamond grains or the like as touched upon above, it is very easy to integrally form the locating projections 56 on the cutting bits 54 with accuracy in position. Each cutting bit 54 thus obtained is attached to the flange members 50a, 50b by silver soldering, for example.

According to the structure employing the locating grooves 52 and locating projections 56, the cutting bits 54 can be easily placed at the prescribed positions on the cutter base 2 with accuracy and can be united with the cutter base.

Figure 12A:
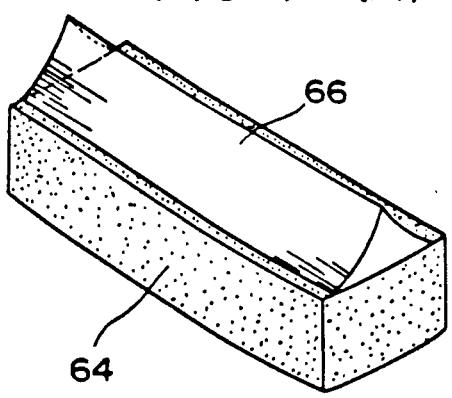
FIGS. 12(A) and 12(B) are perspective view and sectional front view showing the principal portion of a seventh embodiment of this invention.
Figure 12B:
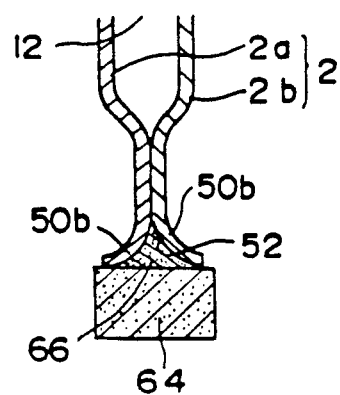

The locating projections as specified above may of course be separately formed and attached to the cutting bits as shown in FIGS. 12(A) and 12(B) as a seventh embodiment of this invention. In this case, the locating projections 66 to be fitted in the locating grooves 52 formed between the flange members 50a, 50b of the cutter base 2 may be formed of a binding material such as silver solder. Each cutting bit 64 may be provided with two or more locating projections 66. For instance, two locating projections may be formed discontinuously one on either end of one cutting bit. Similarly to the sixth embodiment described earlier, the cutting bits 64 can be easily placed at the prescribed positions on the cutter base 2 with accuracy and can be firmly united with the cutter base.

As is clear from the disclosure thus far made, the rotary cutter wheel offered by the present invention which is provided with the air passage cavity having air intake ports and air injection ports can spontaneously generate a high-speed current of air by the centrifugal force brought about by the rotation of the cutter wheel, to thereby effectively cool the cutting bits and blow off cutting chips produced in cutting a rigid material such as concrete without using a forced air-supplying means such as an air compressor. Furthermore, by forming the locating grooves between the flange members of the disc plates and the locating projections on the cutting bits, the cutting bits can be easily located at the prescribed positions on the peripheral segments of the cutter base with accuracy and can be firmly united with the cutter base. Besides, the cutter wheel of this invention is simple in structure, easy to assemble and handle and applicable to a common electric hand cutter.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. A rotary cutter wheel comprising:
a cutter base formed of two mutually abutting parallel substantially disc-shaped plates, said cutter base having a radially inner portion, a radially outer portion, a radially intermediate bulging portion within which is defined an air passage cavity, a plurality of air intake ports formed at a radially inner side of said intermediate bulging portion and communicating with said air passage cavity, a plurality of air injection ports formed at a radially outer side of said intermediate bulging portion and communicating with said air passage cavity, and a plurality of radially extending slots extending from said air passage cavity through a periphery of said cutter base;

a plurality of flap means fixed to said cutter base respectively adjacent said plurality of air intake ports for forcing air into said air passage cavity upon rotation of said cutter base; and a plurality of cutting bits fixed to said periphery of said cutter base.

2. A rotary cutter wheel as recited in claim 1, wherein each of said plurality of flap means is formed integrally with said cutter base.

3. A rotary cutter wheel as recited in claim 1, further comprising;

flange members formed by bending peripheral portions of said disc-shaped plates away from one another; and wherein said plurality of cutting bits are fixed to said flange members.

4. A rotary cutter wheel as recited in claim 3, wherein circumferential spill grooves are formed in each of said disc-shaped plates radially between said intermediate bulging portion and said flange members.

5. A rotary cutter wheel as recited in claim 4, further comprising reinforcing plates mounted in at least one of said spill grooves.

6. A rotary cutter wheel as recited in claim 3, wherein each of said cutting bits includes a locating projection; and a locating groove is formed between opposing ones of said flange members and is adapted to receive said locating projection of each of said cutting bits.

7. A rotary cutter wheel as recited in claim 6, wherein each of said locating projections is integrally formed with each respective cutting bit by sintering.

8. A rotary cutter wheel as recited in claim 6, wherein each of said locating projections is separately formed of a binding material and is attached to each respective cutting bit.

9. A rotary cutter wheel as recited in claim 1, wherein each of said flap means comprises a radially inwardly stepped portion of said intermediate bulging portion of said cutter base.

10. A rotary cutter wheel as recited in claim 1, wherein each of said flap means is formed in a substantially quadrant cup shape.

11. A rotary cutter wheel as recited in claim 1, wherein said air intake ports are formed in pairs at directly opposing positions on opposing ones of said two disc-shaped plates.

12. A rotary cutter wheel as recited in claim 1, wherein said air intake ports are formed in pairs on opposing ones of said two disc-shaped plates at positions circumferentially offset from one another.

13. A rotary cutter wheel as recited in claim 1, further comprising a plurality of partition members mounted within said air passage cavity so as to form a plurality of segregated air passages between respective ones of said intake ports and said injection ports.

14. A rotary cutter wheel as recited in claim 1, wherein said cutting bits comprise shaped and sintered ultrahard abrasive grains.

15. A rotary wheel comprising:

a cutter base comprising two parallel substantially disc-shaped plates, each of which has an inner face and an outer face, and a radially outer portion, a radially inner portion, and a radially intermediate portion, said inner faces of said two parallel plates abutting one another along said radially inner and said radially outer portions and being spaced from one another along said radially intermediate portion to define an air passage cavity therebetween;

a plurality of air intake ports formed at a radially inner side of said radially intermediate portion of at least one of said two parallel plates in communication with said air passage cavity, for introducing air into said air passage cavity upon rotation of said cutter base;

a plurality of air injection ports formed at a radially outer side of said radially intermediate portion of at least one of said two parallel plates in communication with said air passage cavity, said air injection ports being adapted to have air injected therethrough from said air passage cavity;

a plurality of radially extending slots formed in said cutter base and extending from said plurality of injection ports, respectively, through an outer periphery of said cutter base; and a plurality of cutting bits fixed to said outer periphery of said cutter base.

16. A rotary cutter wheel as recited in claim 15, further comprising a plurality of flap means fixed to said cutter base respectively adjacent said plurality of air intake ports, for forcing air into said air passage cavity upon rotation of said cutter base.

17. A rotary cutter wheel as recited in claim 16, wherein each of said flap means comprises a radially inwardly stepped portion of said radially intermediate portion of a respective one of said two parallel plates.

18. A rotary cutter wheel as recited in claim 16, wherein each of said flap means is formed in a substantially quadrant cup shape.

19. A rotary cutter wheel as recited in claim 15, further comprising flange members formed by bending peripheral portions of said disc-shaped plates away from one another; and wherein said plurality of cutting bits are fixed to said flange members.

20. A rotary cutter wheel as recited in claim 19, wherein each of said cutting bits includes a locating projection; and a locating groove is formed between opposing ones of said flange members and is adapted to receive said locating projection of each of said cutting bits.

* * * * *